United States Patent
Booth et al.

(10) Patent No.: US 10,532,675 B2
(45) Date of Patent: Jan. 14, 2020

(54) VEHICLE SEAT TRIM COVER WITH INTEGRALLY KNITTED ATTACHMENT FEATURES

(71) Applicant: GM Global Technology Operations LLC, Detroit, MI (US)

(72) Inventors: Daniel W. Booth, Troy, MI (US); Paul W. Alexander, Ypsilanti, MI (US); Nancy L. Johnson, Northville, MI (US); Heidi H. McAdoo-Wilson, Tecumseh (CA); Janet C. Robincheck, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/994,277

(22) Filed: May 31, 2018

(65) Prior Publication Data
US 2019/0366892 A1  Dec. 5, 2019

(51) Int. Cl.
*B60N 2/58* (2006.01)

(52) U.S. Cl.
CPC .................... *B60N 2/5825* (2013.01)

(58) Field of Classification Search
CPC .................................................. B60N 2/5825
USPC ..................... 297/218.1, 218.2, 218.3, 218.5
See application file for complete search history.

(56) References Cited

U.S. PATENT DOCUMENTS

| | | | | |
|---|---|---|---|---|
| 4,558,905 A | * | 12/1985 | Natori ................... | A47C 7/748 297/452.6 |
| 4,579,389 A | * | 4/1986 | Shimbori ................ | A47C 7/18 297/452.6 |
| 4,718,718 A | * | 1/1988 | Maruyama .......... | B60N 2/5685 297/452.6 X |
| 4,865,383 A | * | 9/1989 | Sbaragli ............... | B60N 2/5825 297/218.2 |
| 5,308,141 A | * | 5/1994 | Robinson ............. | B60N 2/5891 297/218.4 |
| 5,326,150 A | * | 7/1994 | Robinson ............. | B60N 2/5891 297/218.2 |
| 5,338,092 A | * | 8/1994 | Wiltsey .................. | A47C 31/11 297/218.4 |
| 5,768,758 A | * | 6/1998 | Deignan ................ | A47C 31/02 297/218.3 X |
| 5,890,381 A | * | 4/1999 | Leeke ..................... | D04B 1/22 297/218.1 |

(Continued)

OTHER PUBLICATIONS

Booth et al.; U.S. Appl. No. 15/994,345, filed May 31, 2018 entitled "Vehicle Seat Trim Covers With Knitted Attachment Structures Formed With Heat-Activated Yarns"; 59 pages.

(Continued)

*Primary Examiner* — Rodney B White (57) ABSTRACT

A knitted seat trim cover for attachment to a vehicle seat includes a knitted trim panel configured to be installed over one or more support members of the vehicle seat and at least one fastener tube integrally knitted to the trim panel. The fastener tube is positioned on a back side of the trim panel facing the one or more support members. The knitted seat trim cover also includes an elongated fastener member positioned inside the at least one fastener tube. The elongated fastener member is configured to releasably connect to a complimentary fastener member on the vehicle seat.

16 Claims, 9 Drawing Sheets

(56) References Cited

U.S. PATENT DOCUMENTS

| | | | | |
|---|---|---|---|---|
| 5,931,538 | A * | 8/1999 | Cayet | B60N 2/58 297/218.1 |
| 6,499,801 | B1 | 12/2002 | Peterson et al. | |
| 6,722,742 | B2 | 4/2004 | Potes et al. | |
| 6,842,959 | B2 | 1/2005 | Coffield et al. | |
| 6,932,430 | B2 | 8/2005 | Bedford et al. | |
| 6,955,402 | B2 | 10/2005 | VanDeRiet et al. | |
| 7,017,997 | B2 * | 3/2006 | Takezawa | B60N 2/5825 297/452.6 |
| 7,096,549 | B2 | 8/2006 | Coffield | |
| 7,132,144 | B2 | 11/2006 | Roberts | |
| 7,141,768 | B2 | 11/2006 | Malofsky et al. | |
| 7,159,293 | B2 | 1/2007 | Coffield et al. | |
| 7,235,504 | B2 | 6/2007 | Shirasaki et al. | |
| 7,422,281 | B2 | 9/2008 | Miller | |
| 7,422,287 | B2 | 9/2008 | Heidmann et al. | |
| 7,588,290 | B2 * | 9/2009 | Takezawa | B60N 2/5825 297/218.2 |
| 7,607,730 | B2 * | 10/2009 | Moseneder | A47C 5/06 297/218.1 X |
| 7,669,889 | B1 | 3/2010 | Gorman et al. | |
| 7,690,723 | B2 | 4/2010 | Evans et al. | |
| 7,695,064 | B2 | 4/2010 | Thomas et al. | |
| 7,784,819 | B2 | 8/2010 | Lawall et al. | |
| 8,176,863 | B2 | 5/2012 | Evans et al. | |
| 8,176,868 | B2 | 5/2012 | Han | |
| 8,201,880 | B2 * | 6/2012 | Kato | B60N 2/002 297/218.2 X |
| 8,398,174 | B2 * | 3/2013 | Hofmann | B60N 2/5825 297/218.1 |
| 8,690,256 | B2 * | 4/2014 | Hofmann | B60N 2/5825 297/218.2 |
| 8,820,780 | B2 | 9/2014 | Thomas | |
| 8,845,020 | B2 * | 9/2014 | Sei | B60N 2/5825 297/218.3 |
| 8,919,878 | B2 * | 12/2014 | Sakamoto | B60N 2/5825 297/218.1 |
| 8,974,004 | B2 * | 3/2015 | Sakamoto | B60N 2/64 297/218.1 |
| 8,991,934 | B2 * | 3/2015 | Sei | B60N 2/5825 297/452.59 |
| 8,998,339 | B2 | 4/2015 | Peterson et al. | |
| 9,055,818 | B2 | 6/2015 | Ludeke et al. | |
| 9,061,882 | B2 | 6/2015 | Masuda et al. | |
| 9,380,840 | B2 | 7/2016 | Okawa et al. | |
| 9,408,467 | B2 | 8/2016 | Peterson et al. | |
| 9,462,891 | B2 | 10/2016 | Kikuchi et al. | |
| 2002/0002854 | A1 * | 1/2002 | Imoto | B60N 2/002 73/1.13 |
| 2002/0117882 | A1 * | 8/2002 | Takezawa | B60N 2/5825 297/218.1 |
| 2005/0081353 | A1 * | 4/2005 | Law | B60N 2/5883 297/218.4 X |
| 2007/0066197 | A1 | 3/2007 | Woo et al. | |
| 2010/0176633 | A1 * | 7/2010 | Brncick | B60N 2/5816 297/228.11 |
| 2012/0267937 | A1 * | 10/2012 | Sahashi | B60N 2/1615 297/452.42 |
| 2012/0306256 | A1 * | 12/2012 | Okuyama | B60N 2/5825 297/452.6 |
| 2013/0057035 | A1 * | 3/2013 | Nishiura | B60N 2/7011 297/218.3 |
| 2016/0317047 | A1 * | 11/2016 | Sugiyama | A61B 5/6893 |
| 2016/0375807 | A1 * | 12/2016 | Kageyama | B60N 2/5883 297/452.61 |
| 2017/0245602 | A1 | 8/2017 | Nakaya et al. | |
| 2018/0105084 | A1 * | 4/2018 | Tobata | B60N 2/90 |
| 2019/0023163 | A1 * | 1/2019 | Schrey | B60N 2/58 |
| 2019/0031063 | A1 * | 1/2019 | Suzuki | B60N 2/5883 |

OTHER PUBLICATIONS

Booth et al.; U.S. Appl. No. 16/033,678, filed Jul. 12, 2018 entitled "Vehicle Seat Trim Covers Including Integrally-Knit Backing Materials and Methods of Manufacturing Vehicle Seat Trim Covers"; 40 pages.

Booth et al.; U.S. Appl. No. 16/178,006, filed Nov. 1, 2018 entitled "Knitted Seat Trim Cover With Integral Airbag Pocket"; 52 pages.

* cited by examiner

VEHICLE SEAT TRIM COVER WITH INTEGRALLY KNITTED ATTACHMENT FEATURES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle seat trim covers with integrally knitted attachment features.

Seat trim covers for vehicle seats are often made of knitted fabrics. Such seat trim covers are installed over the internal structure and foam of the vehicle seat to result in an aesthetically pleasing and comfortable seating surface. The knitted seat trim covers are secured to the underlying internal structure and/or foam in order to prevent the seat trim cover from wrinkling, bridging, folding or exhibiting other undesirable surface imperfections.

Attachment features are used to attach the seat trim covers to the internal structure or foam. Such attachment features are connected to the seat trim covers and are secured to complementary attachment features located on the underlying internal structure of the seat. The attachment features located on the seat trim cover are secured to complementary attachment features on the underlying internal structure during installation of the seat trim cover to maintain an aesthetically pleasing appearance.

SUMMARY

In one example in accordance with the present disclosure, a knitted seat trim cover for attachment to a vehicle seat includes a knitted trim panel configured to be installed over one or more support members of the vehicle seat and at least one fastener tube integrally knitted to the trim panel. The fastener tube is positioned on a back side of the trim panel facing the one or more support members. The knitted seat trim cover also includes an elongated fastener member positioned inside the at least one fastener tube. The elongated fastener member is configured to releasably connect to a complementary fastener member on the vehicle seat.

In one aspect, the at least one fastener tube is positioned laterally across the trim panel and extends from an inboard side of the trim panel to an outboard side of the trim panel.

In another aspect, the at least one fastener tube includes a first fastener tube and a second fastener tube. The first fastener tube is integrally knitted to the trim panel and is positioned laterally across the trim panel from an inboard side of the trim panel to an outboard side of the trim panel. The second fastener tube is integrally knitted to the trim panel and is positioned perpendicularly to the first fastener tube.

In another aspect, the elongated fastener member is a drawstring and the at least one fastener tube is positioned at a periphery of the knitted trim panel.

In another aspect, a portion of the at least one fastener tube is positioned between the elongated fastener member and the complementary fastener member when the elongated fastener member is connected to the complementary fastener member.

In another aspect, the elongated fastener member has an open cross-sectional shape configured to receive a hook portion of the complementary fastener member. The at least one fastener tube is positioned inside the open cross-sectional shape of the elongated fastener member between the elongated fastener member and the hook portion of the complementary fastener member when the complementary fastener member is connected to the elongated fastener member.

In another aspect, the at least one fastener tube includes two or more openings spaced longitudinally along a length of the at least one fastener tube. The elongated fastener member is a rigid cylindrical rod and the complementary fastener member includes a hook portion configured to connect to the cylindrical rod at the two or more openings in the at least one fastener tube.

In another aspect, the at least one fastener tube includes one or more openings. The elongated fastener member includes one or more projections that project through the one or more openings in the at least one fastener tube. The one or more projections are configured to connect to the complementary fastener member.

In another aspect, the elongated fastener member includes a male portion with a rounded cross-sectional profile and the complementary fastener member has an elongated groove sized to accept the male portion of the elongated fastener member and the at least one fastener tube therein.

In another aspect, the at least one fastener tube is configured to stretch when contacted by the complementary fastener member to permit the complementary fastener member to engage the elongated fastener member positioned inside the at least one fastener tube.

In another example in accordance with the present disclosure, a knitted seat trim cover for attachment to a vehicle seat includes a knitted cover panel configured to be installed over one or more foam support members of the vehicle seat. The knitted cover panel includes at least one knitted loop integrally knitted in the knitted cover panel. The knitted trim cover also includes a fastener member connected to the knitted cover panel by the at least one knitted loop. The fastener member is configured to releasably connect to a complementary fastener member on the vehicle seat to secure the knitted cover panel relative to the one or more foam support members of the vehicle seat.

In one aspect, the at least one knitted loop is knitted through an opening in the fastener member.

In another aspect, the at least one knitted loop is knitted around one or more projections on the fastener member.

In another aspect, the fastener member is a first half of a zipper that includes a plurality of teeth. The at least one knitted loop includes a plurality of knitted loops. The plurality of knitted loops positioned between the plurality of teeth. The complementary fastener member on the vehicle seat is a second half of the zipper and the first half of the zipper is configured to releaseably connect to the second half of the zipper to secure the knitted cover panel to the vehicle seat.

In another aspect, the fastener member is an elongated rigid bar with a continuous cross-section. The fastener member includes a connecting portion configured to fit inside a corresponding receiving portion of the complementary fastener member. The fastener member includes at least one aperture. The at least one knitted loop positioned in the at least one aperture to attach the knitted cover panel to the fastener member.

In another aspect, the fastener member is a toggle button including a central hole extending therethrough. The at least one knitted loop extends through the central hole of the toggle button.

In another aspect, the at least one knitted loop includes a plurality of knitted loops aligned in a transverse direction across the knitted cover panel and the fastener member is connected transversely to the knitted cover panel by the plurality of knitted loops.

In another aspect, the knitted cover panel includes a second plurality of knitted loops aligned in a direction perpendicular to the plurality of knitted loops and the second fastener member is connected to the knitted cover panel by the second plurality of knitted loops.

In another aspect, the at least one knitted loop is an elongated knitted tube and the fastener member is positioned inside the elongated knitted tube.

In another example in accordance with the present disclosure, a knitted seat trim cover for attachment to a vehicle seat includes a knitted cover panel configured to be installed over one or more foam support members of the vehicle seat. The knitted seat trim cover also includes a first plurality of knitted tubes integrally knitted in the knitted cover panel. The first plurality of knitted tubes oriented transversely across the knitted cover panel from an inboard side of the knitted cover panel to an outboard side of the knitted cover panel. The knitted seat trim cover also includes a second plurality of knitted tubes integrally knitted in the knitted cover panel. The second plurality of knitted tubes oriented perpendicularly to the first plurality of knitted tubes. The knitted seat trim cover also includes a first plurality of rigid fastener members positioned inside the first plurality of knitted tubes and a second plurality of rigid fastener members positioned inside the second plurality of knitted tubes. The first plurality of rigid fastener members and the second plurality of rigid fastener members are configured to engage complementary fastener members on the vehicle seat to retain the knitted cover panel over the one or more foam support members of the vehicle seat.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The vehicle seat trim cover of the present disclosure is constructed using a knitted fabric. During the knitting process, various knitted structures are integrally knitted into the trim cover that retain fastener members in the trim cover. The fastener members secure the trim cover to the seat over foam support structures to create a smooth, wrinkle-free seating surface that is comfortable and aesthetically pleasing.

In one such example trim cover, one or more fastener tubes are integrally knitted in the trim cover. The fastener tubes connect rigid fastener members to the trim cover. The fastener members are configured to connect to complementary fastener members on the vehicle seat to retain the trim cover to the vehicle seat.

In another example trim cover, one or more knitted loops connect the trim cover to the rigid fastener member. The fastener member includes one or more apertures and the one or more knitted loops are routed through the one or more apertures to secure the trim cover to the fastener member. The fastener member connects to a complementary fastener member on the vehicle seat to retain the trim cover to the vehicle seat.

In the aforementioned examples, the knitted tubes and/or the knitted loops are integrally formed with the knitted trim cover such that the fastener members do not need to be connected to the trim cover using stiches, adhesives or other bonding elements. Instead, the fastener members are inserted into the knitted tubes or the knitted loops are inserted into apertures in the fastener members. Alternatively, the knitted tubes and/or the knitted loops are knitted around the fastener members to connect the fastener members to the trim cover. In either instance, the need for time-consuming secondary attachment steps is reduced or eliminated using the knitted trim covers of the present disclosure.

The present disclosure describes use of knitted tubes and/or knitted loops integrally knitted with a trim cover for a vehicle seat. The knitted structures of the present disclosure, however, can be used in other applications. The knitted structures can also be used, for example, on other interior trim components, on furniture, on clothing, in architectural applications, and on other consumer products.

Figure 1:
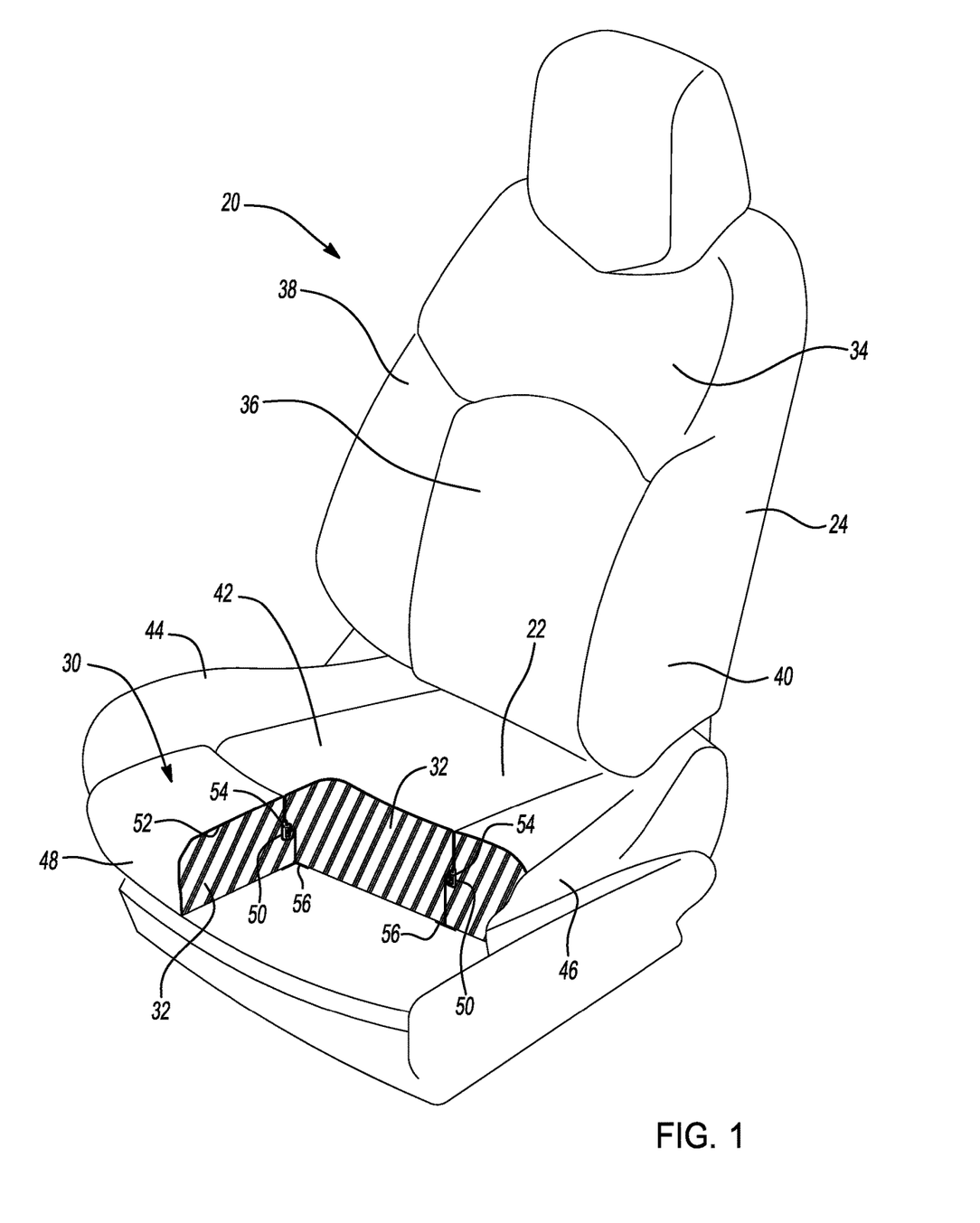
FIG. 1 is a perspective view of a vehicle seat including an example trim cover in accordance with the present disclosure.

Referring now to FIG. 1, a vehicle seat 20 includes a bottom portion 22 and a back portion 24. A trim cover 30 is secured to the seat 20 to cover one or more foam support members 32. The trim cover 30 is pulled tightly against the foam support members 32 to prevent the trim cover 30 from wrinkling, bulging or otherwise separating from the foam support members 32. In the example shown, the trim cover 30 includes a top section 34, a back middle section 36, a back inboard side section 38, a back outboard side section 40, a bottom middle section 42, a bottom inboard side section 44, a bottom outboard side section 46 and a front section 48. These various sections of the trim cover 30 are connected to one another and are secured to the vehicle seat 20 to cover the foam support members 32.

The trim cover 30 is knitted as a single panel of material. The various sections of the trim cover 30 such as the bottom middle section 42, the bottom inboard side section 44, the bottom outboard side section 46 and/or the front section 48 are joined to one another and may appear to have a seam. The adjacent sections, however, are formed to appear as such during a singular knitting process. In other examples, the various sections of the trim cover 30 are seamlessly connected. The trim cover 30, in the example shown, is knitted with the contours and shape of the underlying foam support members 32 so that the trim cover 30 is knitted as an integrally formed panel of material. Since the trim cover 30 is integrally formed during the knitting process, secondary processing, such as sewing or other joining steps, is minimized.

In other examples, the trim cover 30 is formed by knitting two or more panels of material together. In such examples, the panels of knit material are subsequently sewn together. More than one panel of material may be required to form trim covers 30 that are secured to seats 20 with complex geometries, for example. In such instances, the trim cover 30 is formed from as few panels of knit material as possible to minimize the secondary processing.

In still other examples, the trim cover 30 is integrally knit as a single panel of material to cover the foam support members 32. Such example trim covers 30 do not have to be knit in conformance with the contours and shape of the underlying foam support members 32. Instead, the trim cover 30 is knit as a single panel of material that appears as a smooth panel across the seat 20. Such example trim covers 30 include a sufficient amount of elasticity or stretch so that the trim cover 30 can flex when the seat 20 is folded or moved.

Referring back to the example shown in FIG. 1, the trim cover 30 includes one or more knitted fastener tubes 50. The fastener tubes 50 are integrally formed in the trim cover 30 during the knitting process. The fastener tubes 50 are connected to a foam-facing side 52 of the trim cover 30. In the example shown, the fastener tubes 50 are positioned laterally (i.e., extending from an inboard side of the seat 20 to the outboard side of the seat 20) and positioned longitudinally (i.e., extending from a rear side of the seat 20 toward a front side of the seat 20). In the example shown in FIG. 1, one fastener tube 50 is positioned at or near the mating sides of the bottom middle section 42 and the front section 48 and a second fastener tube 50 is positioned at or near the mating sides of the bottom middle section 42 and the bottom outboard side section 46.

Fastener members 54 are positioned inside the fastener tubes 50. As will be described further below, the fastener members 54 are retained inside the fastener tubes 50 and engage complementary fastener members 56. The complementary fastener members 56 are connected to the foam support members 32 and/or to an internal structure of the seat 20. With this configuration, the fastener members 54 exert forces on the trim cover 30 in a direction toward the foam support members 32 when the fastener members 54 are secured to the complementary fastener members 56. In this manner, the trim cover 30 is retained over the foam support members 32 and prevents the trim cover 30 from wrinkling, bulging or otherwise separating from the seat 20.

Figure 2:
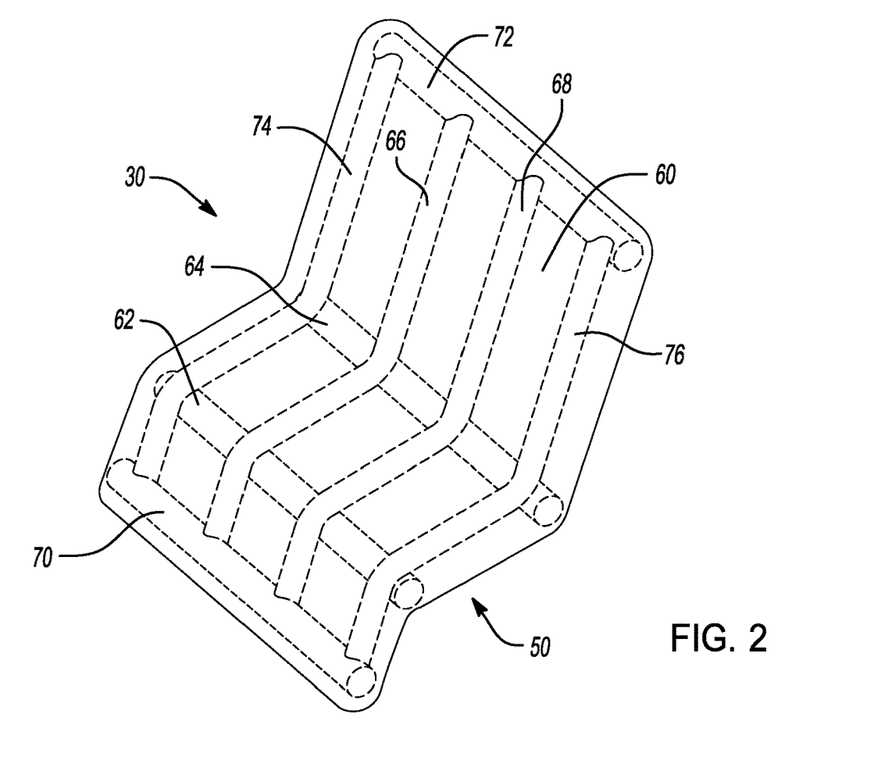
FIG. 2 is an illustration of another trim cover of the present disclosure showing an example layout of knitted fastener tubes.

Referring now to FIG. 2, the trim cover 30 includes a trim panel 60 and a plurality of fastener tubes 50. The trim panel 60 is the outward-facing panel of knitted fabric that is visible when the trim cover 30 is installed on a vehicle seat 20. The plurality of fastener tubes 50, in this example, are integrally knitted to the foam-facing side of the trim panel 60 and, as such, are not visible when the trim cover 30 is installed on the vehicle seat 20 (FIG. 1).

The plurality of the fastener tubes 50, in this example, includes a first lateral fastener tube 62, a second lateral fastener tube 64, a first longitudinal fastener tube 66 and a second longitudinal fastener tube 68. The trim cover 30 also includes a first peripheral lateral fastener tube 70, a second peripheral lateral fastener tube 72, a first peripheral longitudinal fastener tube 74 and a second peripheral longitudinal fastener tube 76. The first and second lateral fastener tubes 62, 64 as well as the first and second longitudinal fastener tubes 66, 68 are configured to include fastener members of various types and shapes as will be described below. The first peripheral lateral fastener tube 70, the second peripheral lateral fastener tube 72, the first peripheral longitudinal fastener tube 74 and the second peripheral lateral fastener tube 76 can also receive fastener members.

In an alternate example, the first peripheral lateral fastener tube 70, the second peripheral lateral fastener tube 72, the first peripheral longitudinal fastener tube 74 and the second peripheral lateral fastener tube 76 include a drawstring. The drawstring can be inserted into the first peripheral lateral fastener tube 70, the second peripheral lateral fastener tube 72, the first peripheral longitudinal fastener tube 74 and the second peripheral lateral fastener tube 76 after the trim cover 30 is knitted. Alternatively, the drawstring can be inlaid into the first peripheral lateral fastener tube 70, the second peripheral lateral fastener tube 72, the first peripheral longitudinal fastener tube 74 and the second peripheral lateral fastener tube 76 during the knitting process. In either example, the drawstring is routed through the first peripheral lateral fastener tube 70, the first peripheral longitudinal fastener tube 74 and the second peripheral lateral fastener tube 76. When the trim cover 30 is installed on the seat 20, the drawstring is cinched around the foam support members 32 to pull the peripheral edges of the trim cover 30 around the seat 20. While the first peripheral lateral fastener tube 70, the second peripheral lateral fastener tube 72, the first peripheral longitudinal fastener tube 74 and the second peripheral lateral fastener tube 76 are shown as separate tubes in FIG. 2, the first peripheral lateral fastener tube 70, the second peripheral lateral fastener tube 72, the first peripheral longitudinal fastener tube 74 and the second peripheral lateral fastener tube 76 can alternatively be knitted as a continuous peripheral tube in trim cover 30.

In examples in which the fastener tubes include fastener members, such as fastener member 54, the trim cover 30 is placed over the foam support members 32. The fastener members 54 that are positioned inside the first and second lateral fastener tubes 62, 64 and inside the first and second longitudinal fastener tubes 66, 68 are connected to complementary fastener members 56. As such, the trim cover 30 is secured tightly over the underlying foam support members 32. In other examples, the trim cover 30 can include other quantities of fastener tubes 50 and/or can include fastener tubes 50 arranged in other patterns.

Figure 3:
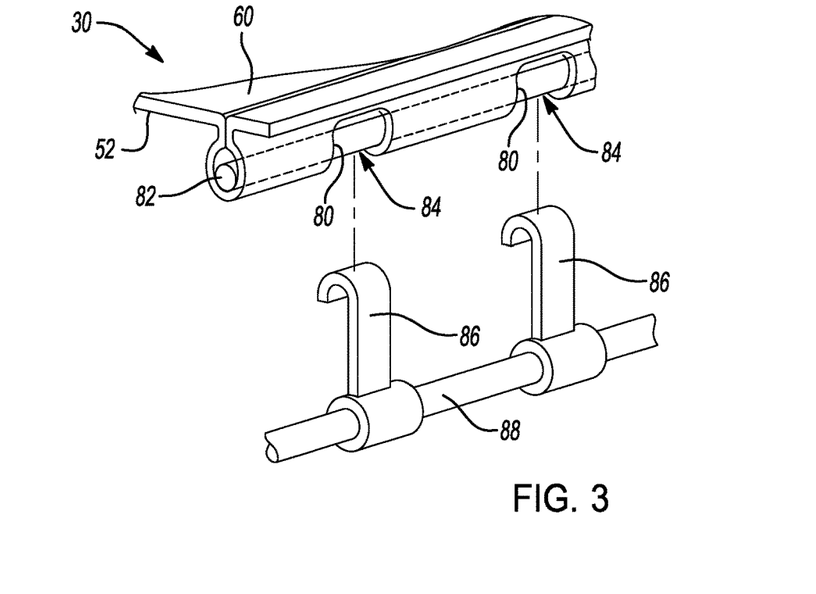
FIG. 3 is an illustration of the trim cover of FIG. 2 showing an example fastener member positioned inside a knitted tube.

As shown in FIG. 3, the trim cover 30, in another example, includes a knitted fastener tube 50 that is attached to the trim panel 60 on a foam-facing side 52 thereof. The fastener tube 50 is integrally knitted in the trim cover 30 and includes a series of openings 80. The openings 80, in this example, are semi-circular notches in the fastener tube 50 that are spaced at predetermined distances longitudinally along the length of the fastener tube. The openings 80 are integrally knitted into the fastener tube 50 so that second processing is not required to remove material or to sew the edges of the openings 80 after the trim cover 30 is formed. In other examples, the openings 80 can have other shapes or sizes.

A rod 82 is inserted into the fastener tube 50 in this example. The rod 82 is a cylindrical length of rigid material such as a suitable thermoplastic material. In other examples, other suitable materials can be used such as other plastics, metals or composites. The rod 82 extends through the fastener tube 50 such that attachment portions 84 of the rod 82 are exposed in the openings 80. Complementary fastener members 86 are positioned on a seat cross member 88. The complementary fastener members 86, in the example shown, are upside-down J-shaped hooks that are positioned along the seat cross member 88 at positions opposite to the attachment portions 84 of the rod 82. As can be appreciated, the complementary fastener members 86 are hooked over the attachment portions of the rod 82 when the trim cover 30 is installed over the foam support members 32 (FIG. 1). In this manner, the trim cover 30 is retained to the seat 20.

The rod 82 can also be inserted into the knitting machine during the forming of the trim panel 60. The rod 82 can be placed either horizontally or vertically into the needle bed of a knitting machine and the fastener tube 50 is knitted around the rod 82 to capture the rod 82 in the fastener tube 50. In such an example, the secondary step of inserting the rod 82 into the trim cover 30 after knitting is eliminated.

In the example shown, the complementary fastener members 86 are formed of a suitable plastic material and connected over the seat cross member 88. In other examples, the complementary fastener members 86 can have other shapes or profiles. For example, the complementary fastener members 86 can be formed out of wire and be bent into a suitable hook shape to be received over the seat cross member 88 or be otherwise attached to a structural member of the seat 20. In still other examples, the complementary fastener members 86 can be a length of hook and loop fastener.

Figure 4:
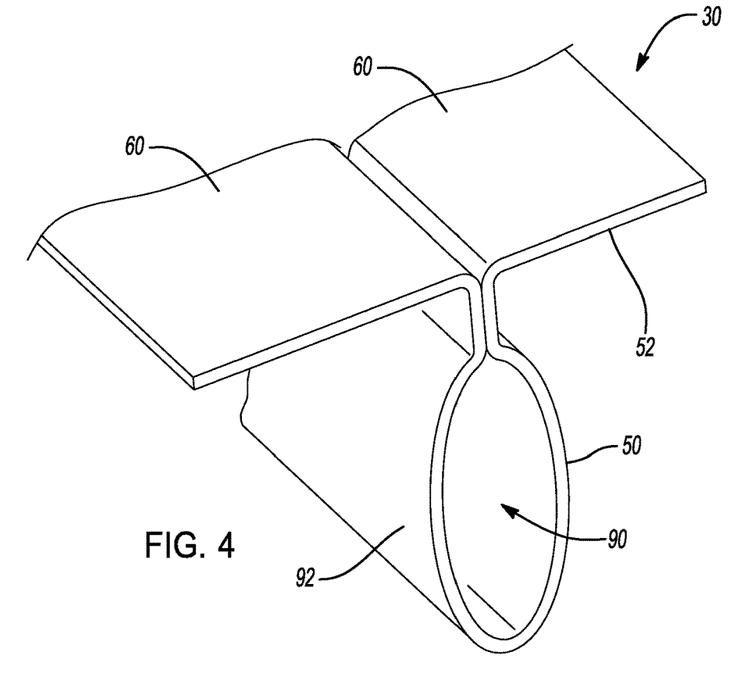
FIG. 4 is an illustration of a knitted tube of the trim cover of FIG. 2.
Figure 5:
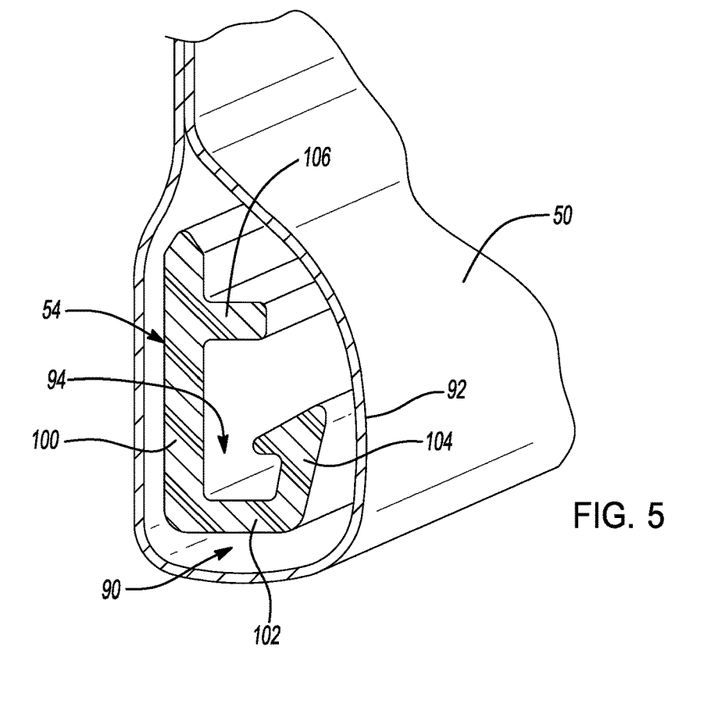
FIG. 5 is a sectional view of an example fastener member positioned inside the knitted tube of FIG. 4.

The knitted fastener tubes 50, as shown in FIG. 4, are integrally knitted in the trim cover 30 and extend from a foam-facing side 52 of the trim panel 60. A knitted wall 92 of the knitted fastener tube 50 defines a central cavity 90. The fastener tube 50 is sized to accept the fastener member 54 therein. As shown in FIG. 5, the central cavity 90 of the fastener tube 50 is larger than the cross-sectional profile of the fastener member 54. The knitted wall 92 is positioned outside an internal retention zone 94 of the fastener member 54.

Figure 6:
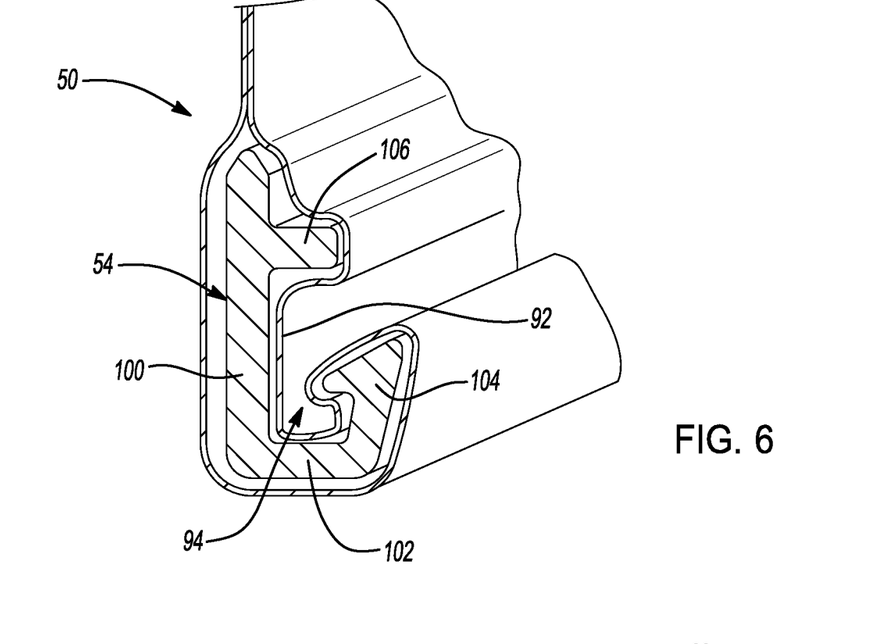
FIG. 6 is a sectional view of the fastener member of FIG. 5 showing the knitted tube positioned around the outer profile of the fastener member.

As shown in FIG. 6, the fastener tube 50 has a sufficient amount of "slack" such that the knitted wall 92 can move into the internal retention zone 94 of the fastener member 54 when a complementary fastener member 56 (not shown in FIG. 6) is engaged to the fastener member 54. When the fastener member 54 is engaged to a complementary fastener member, the knitted wall 92 of the fastener tube 50 more closely follows a periphery of the fastener member 54 than before the fastener member 54 is engaged (FIG. 5).

In such examples, the fastener tube 50 is knit with a lower denier yarn, a stitch pattern with larger gaps between adjacent loops or a yarn with an elastic material. Such alternatives permit the knitted wall 92 of the fastener tube to stretch or otherwise move into the internal retention zone 94 of the fastener member 54.

In other examples, the central cavity 90 can be sized smaller than the fastener member 54. In these examples, the knitted fastener tube 50 is knitted with an elastic yarn or with a knitted pattern that permits the knitted wall 92 to stretch. The knitted wall 92 can stretch, in such examples, to a sufficient size to permit the fastener member 54 to fit inside the central cavity 90 and/or to permit the knitted wall 92 to move into the internal retention zone 94 of the fastener member 54. In this manner, a portion of the fastener tube 50 is positioned between the fastener member 54 and the complementary fastener member 56 when the complementary fastener member 56 is engaged to the fastener member 54.

The fastener member 54, in the example shown in FIGS. 5 and 6, has a continuous cross-sectional shape that includes a back wall 100, a base wall 102, a barb portion 104 and a projecting wall 106. The base wall 102 and the projecting wall 106 are connected to the back wall 100 and project away from the back wall 100 at a right angle. The barb portion 104 projects upward from the base wall 102 at an end of the base wall 102 opposite to the back wall 100. The fastener member 54 has an open cross-sectional shape that permits a complementary fastener member 56 to be inserted into the internal retention zone 94 defined by inner sides of the back wall 100, the base wall 102 and the barb portion 104. The projecting wall 106 projects away from the back wall 100 above the internal retention zone 94. The projecting wall 106 limits vertical movement of a complementary fastener member that is engaged to the fastener member 54. The trim cover 30, in other examples, includes fastener members 54 that have different profiles or different cross-sectional shapes from that shown in FIGS. 5 and 6.

Figure 7:
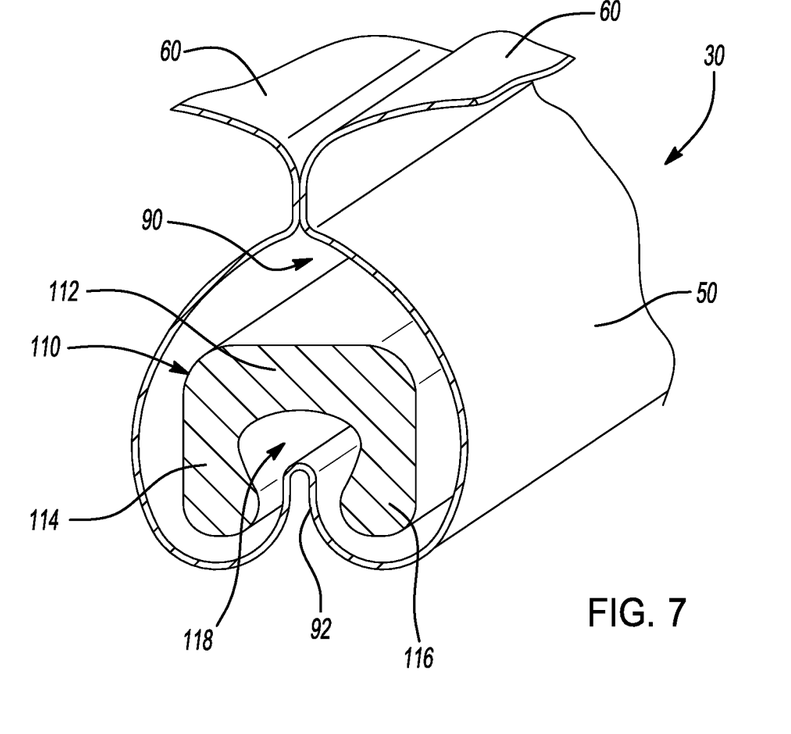
FIG. 7 is a sectional view of another example fastener member positioned inside the knitted tube of FIG. 4.

As shown in FIG. 7, another example trim cover 30 includes a fastener member 110. The fastener member 110 provides a similar function to that previously described but has a different cross-sectional shape. In this example, the fastener member 110 has a continuous cross-sectional shape with a top wall 112, a first side wall 114 and a second side wall 116. The first side wall 114 and the second side wall 116 project downward from the top wall 112 and define a bulb-shaped internal retention gap 118.

As can be appreciated, the fastener member 110 of this example connects to a cylindrical rod or other complementary fastener member that fits inside the internal retention gap 118. During installation, the fastener member 110 is pushed downward onto a complementary fastener member until the first side wall 114 and the second side wall 116 elastically move away from each other a sufficient distance to permit the complementary fastener member to move into the internal retention gap 118. The first side wall 114 and the second side wall 116 then move back toward one another to retain the complementary fastener member in the internal retention gap 118. When the complementary fastener member is inserted into the internal retention gap 118, the knitted wall 92 moves into the internal retention gap 118 as well. The fastener tube 50 is over-sized relative to the size of the fastener member 110 to permit the knitted wall 92 to be positioned between the fastener member 110 and the complementary fastener member when the fastener member 110 is connected to the complementary fastener member.

Figure 8:
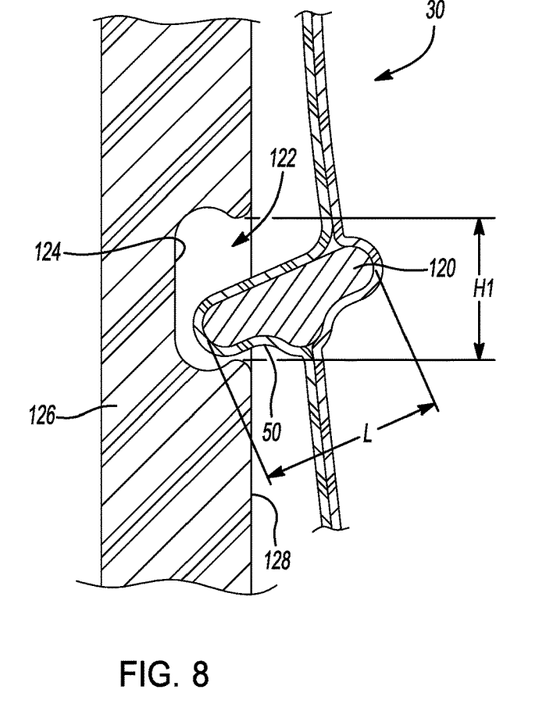
FIG. 8 is a sectional view of another example fastener member positioned inside a knitted tube and positioned adjacent an example complementary fastener member.
Figure 9:
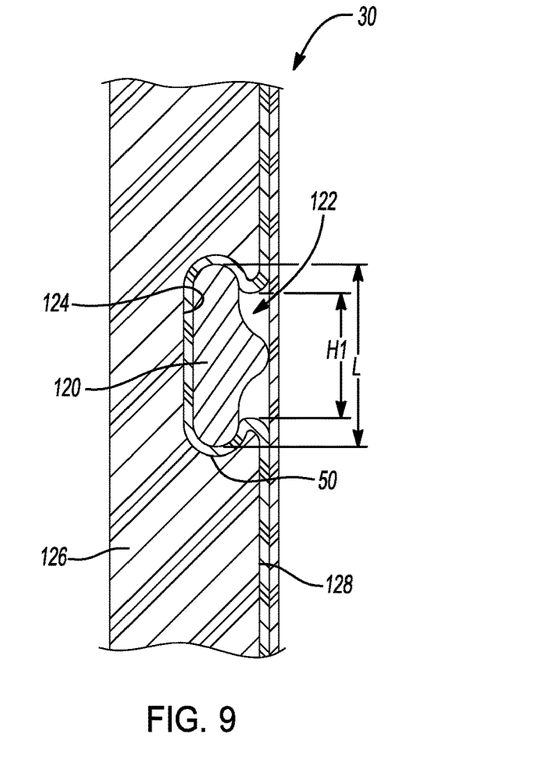
FIG. 9 is a sectional view of the fastener member of FIG. 8 shown connected to the complementary fastener member.

In another example shown in FIGS. 8 and 9, the trim cover 30 includes a fastener tube 50 that holds an elongated fastener member 120. The fastener member 120, in this example, has a continuous cross-section and is pill-shaped with rounded corners. The fastener member 120 is made of an elastic material that elastically deforms and returns to its original shape when the fastener member 120 is inserted into a retention groove 122. The retention groove 122 is an elongated opening defined by an inner groove wall 124 of a support member 126. The support member 126, in this example, is a side wall of the vehicle seat 20 but can be any other suitable support surface to which the trim cover 30 is attached.

As shown, the fastener member 120 has a length L that is greater than a height H1 of the retention groove 122 at the insertion side surface 128 of the support member 126. The fastener member 120 is retained in the retention groove 122 after the fastener member 120 is inserted into the retention groove 122 because the fastener member 120 is relatively larger than the retention groove 122. To insert the fastener member 120 into the retention groove 122, the fastener member 120 is pressed against the insertion side surface 128 at the retention groove 122 until the fastener member 120 elastically deforms and moves into the retention groove 122. A roller or other suitable tool can be used to assist in pressing the fastener member 120 into the retention groove 122. Since the fastener member 120 is positioned inside the fastener tube 50 of the trim cover 30, the trim cover 30 is retained relative to the support member 126 as shown in FIG. 9.

The fastener member 120 is extruded or formed of a suitable elastic material such as a plastic or rubber material and then inserted into the fastener tube 50 of the trim cover 30. In other examples, the fastener member 120 can be integrally knitted into the trim cover 30 using a rubber or heat activated yarn. After knitting, the trim cover 30 can be subjected to a secondary activation or heating process (e.g., heat, infrared light, ultraviolet light) to fuse the rubber or other heat activated yarn into the cross-sectional shape shown.

Figure 10:
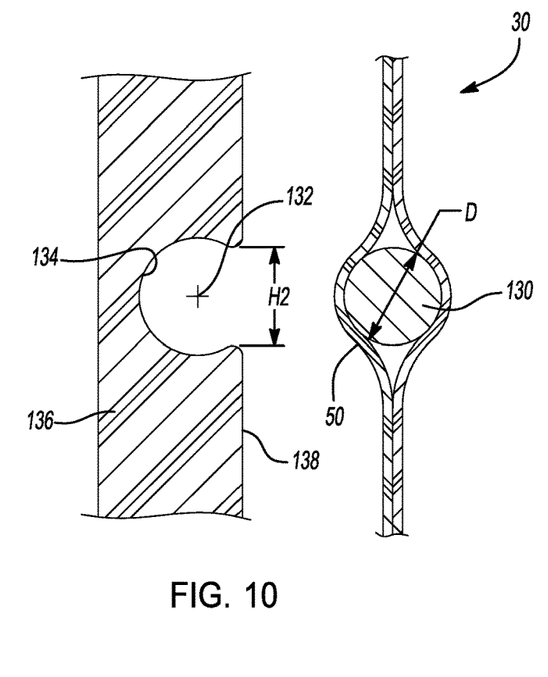
FIG. 10 is a sectional view of another example fastener member positioned inside a knitted tube and positioned adjacent another example complementary fastener member.
Figure 11:
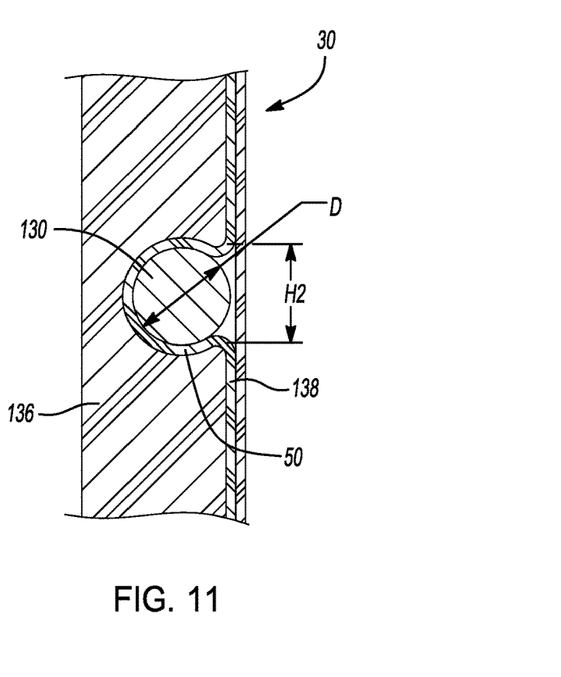
FIG. 11 is a sectional view of the fastener member of FIG. 10 connected to a complementary fastener member.

In another example, shown in FIGS. 10 and 11, the trim cover 30 includes a similar structure and functionality as shown in FIGS. 8 and 9. In this example, however, a fastener member 130 has different cross-sectional shape from that previously described. In this example, the fastener member 130 has a circular cross-sectional shape. The retention groove 132 has a corresponding circular shape defined by an inner groove wall 134.

The fastener member 130 has a diameter D and the retention groove 132 has height H2 at an insertion side surface 138. The diameter D is greater than the height H2. With this relative sizing, the fastener member 130 is retained in the retention groove 132 after the fastener member 130 is pressed into the retention groove 132. After insertion, the fastener member 130 retains the trim cover 30 to a support member 136 because the fastener member 130 is positioned inside the fastener tube 50. This example fastener member 130 is constructed similarly as that previously described with respect to fastener member 120.

The examples shown in FIGS. 8-11 illustrate the trim cover 30 connected to a support member 126, 136 that is oriented vertically. As can be appreciated, the example fastener members 120, 130 can also be used in connection with support members 126, 136 that are oriented horizontally or at oblique orientations.

Figures 12, 13, 14:
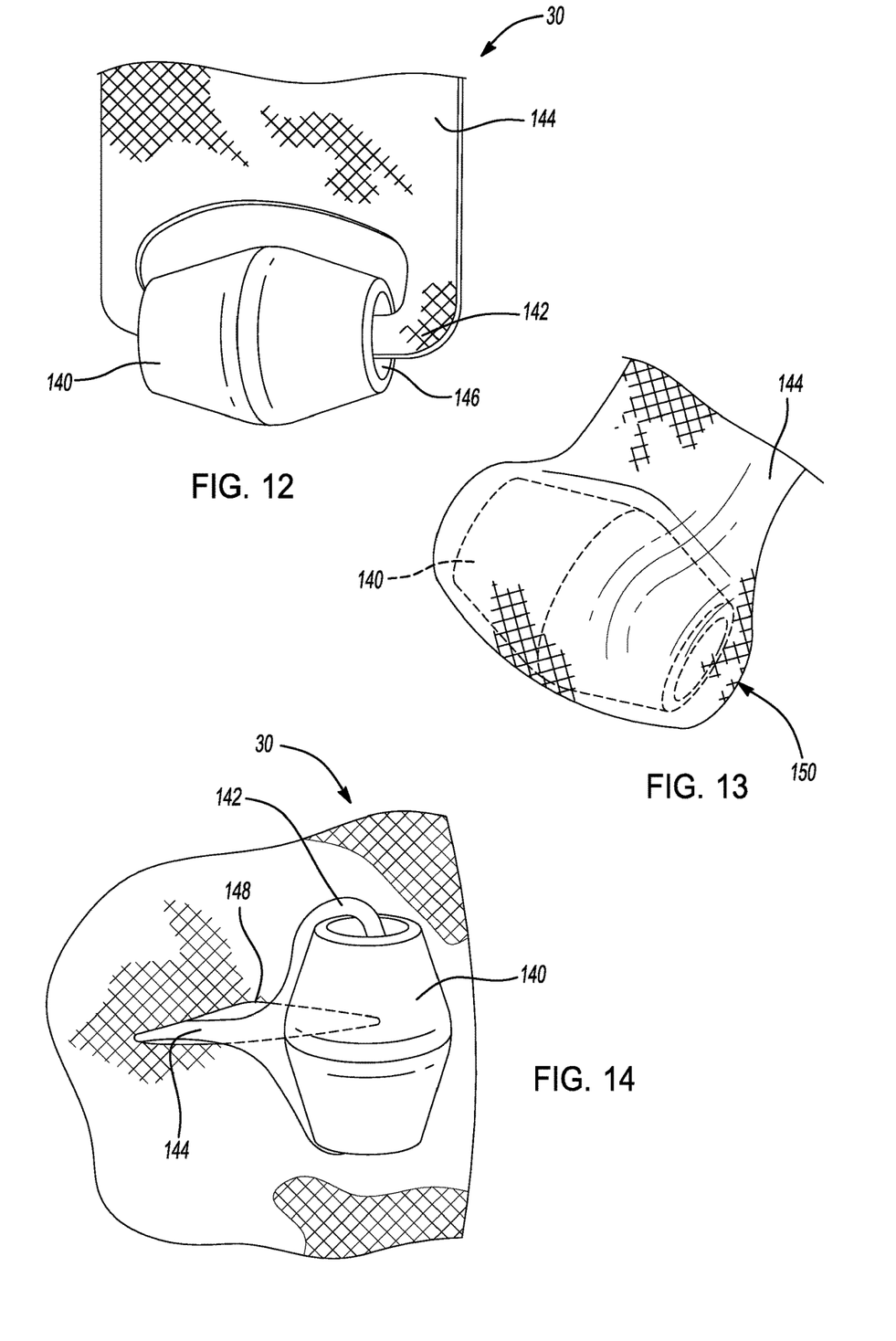
FIG. 12 is an illustration of a toggle button fastener member connected to the trim cover by a knitted loop.
FIG. 13 is an illustration of the toggle button fastener member of FIG. 12 connected to the trim cover by a knitted pocket.
FIG. 14 is an illustration of the toggle button fastener member of FIG. 12 installed through an example button hole.

Referring now to FIGS. 12-14, an example fastener member 140 is connected to the trim cover 30 by a knitted loop 142. The trim cover 30, in this example, includes an extension tab 144. The extension tab 144 is integrally knitted to the trim cover 30. The extension tab 144 is knitted to include the knitted loop 142. The fastener member 140 has a clamshell construction that permits the fastener member to be connected around the knitted loop 142. The extension tab 144 is made in two halves or is formed as a single piece with a living hinge. The fastener member 140 is connected to the trim cover 30 by connecting the fastener member 140 over the knitted loop 142 such that the knitted loop 142 extends through the fastener aperture 146 of the fastener member 140.

As shown in FIG. 14, the trim cover 30, in this example, includes a button hole 148. The button hole 148 is also intergrally knitted into the trim cover 30. The fastener member 140 is inserted through the button hole 148. In this manner, the trim cover 30 can be secured around portions of the vehicle seat 20, such as around a cross-member, support rod or other structural member.

In another example, as shown in FIG. 13, the fastener member 140 is retained to the extension tab 144 in a knitted pocket 150. In this example, the fastener member 140 is placed in the knitting bed during the knitting process and the knitted pocket 150 is knitted around the fastener member 140 with the trim cover 30. Since the knitted pocket 150 is integrally formed with the trim cover 30 and the extension tab 144, no secondary processing is necessary to connect the fastener member 140 to the trim cover 30. In another example, the knitted pocket 150 is formed with an open end. In such examples, the fastener member 140 is inserted into the knitted pocket 150 through the open end after the trim cover 30 is knitted with one or more of the knitted pockets 150. The fastener member 140, in the examples shown in FIGS. 12-14, is a toggle button. In other examples, the fastener member 140 can be other types of buttons and/or have different shapes or profiles.

Figure 15:
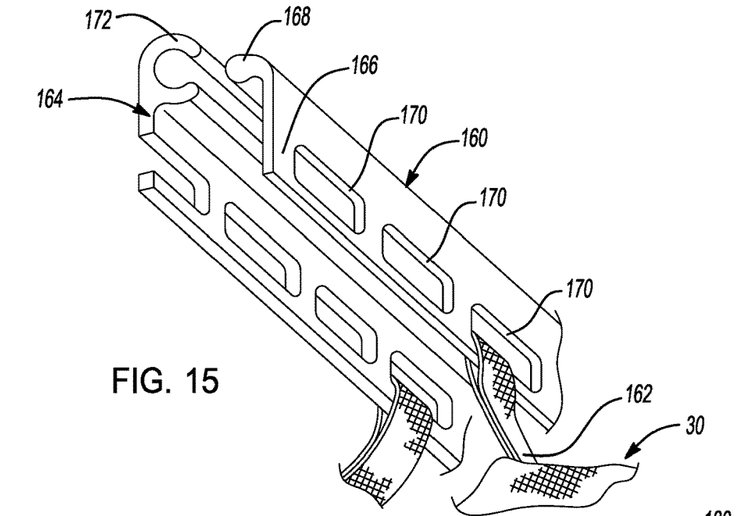
FIG. 15 is an illustration of another example fastener member connected to a trim cover by a knitted loop.

Referring now to FIG. 15, an example fastener member 160 is connected to the trim cover 30 by a knitted loop 162. In this example, the fastener member 160 is an elongated rigid fastener strip that can releasably connect to a complementary fastener member 164. The fastener member 160 includes a connector extension 166 and a male portion 168. The connector extension 166 is a wall that includes one or more apertures 170. The male portion 168 is connected to and projects perpendicularly from the connector extension 166. The male portion includes a rounded profile that fits inside a female portion 172 of the complementary fastener member 164. As can be appreciated, the outer diameter of the male portion 168 is larger than the inner diameter of the female portion 172 such that the male portion 168 is retained inside the female portion 172 when the male portion 168 is inserted inside the female portion 172. The fastener member 160 and the complementary fastener member 164 are made of suitable plastic materials such that the male portion 168 and the female portion 172 can be coupled and de-coupled as desired.

The connector extension 166 is connected to the trim cover 30 by the knitted loop 162. The knitted loop 162 is integrally formed with the trim cover 30. The fastener member 160 is placed in the knitting bed during the knitting process and the knitted loop 162 is knitted through the aperture 170. The apertures 170 are sized to permit the knitting needles of the knitting machine to pass through the apertures 170. In this manner, the fastener member 160 does not need to be connected to the trim cover 30 using a secondary process. The example of FIG. 15 shows the trim cover 30 connected to the fastener member 160 using one knitted loop 162. In other examples, more than one knitted loop 162 can be knitted through the other apertures 170 to further connect the trim cover 30 to the fastener member 160.

Figure 16:
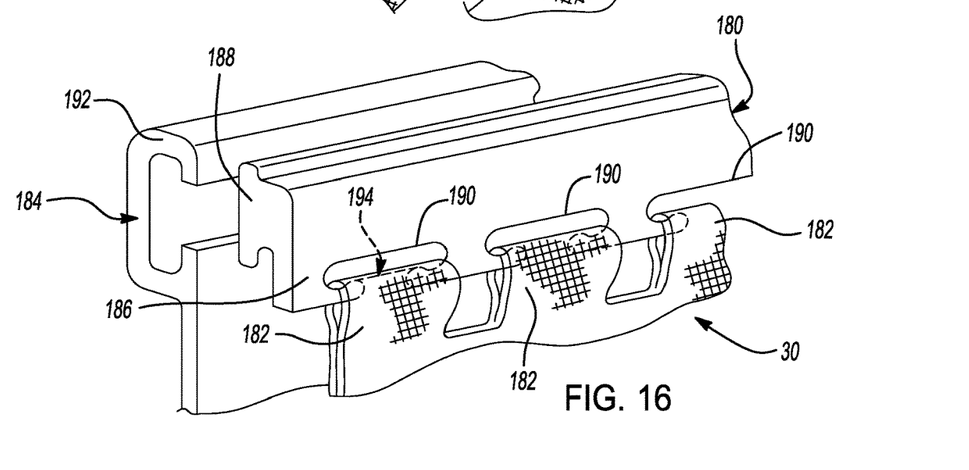
FIG. 16 is an illustration of another example fastener member connected to a trim cover by a series of knitted loops.

Another example trim cover 30 includes a fastener member 180 connected to the trim cover 30 using a plurality of knitted loops 182. This example, as shown in FIG. 16, is similar to the example previously described and shown in FIG. 15. In this example, the fastener member 180 has a different shape than the fastener member 160 previously described. In this example, the male portion 188 has a rounded rectangular shape that projects perpendicularly from the connector extension 186. The female portion 192 of the complementary fastener member 184 has a similar rounded rectangular opening to permit the male portion 188 to fit inside the female portion 192. As previously described, the male portion 188 is pressed into the female portion and can be coupled (and de-coupled) from each other to retain (or remove) the trim cover 30.

As shown in FIG. 16, the knitted loops 182 are integrally knitted with the trim cover 30. In one example, the fastener member 180 is placed in the knitting bed during the knitting process and the knitted loops 182 are knitted through the apertures 190 in the fastener member 180. In another example, the trim cover 30 is knitted with the knitted loops 182. The trim cover 30, in this alternate example, is then connected to the fastener member 180 by inserting the knitted loops 182 into the apertures 190 through an aperture gap 194. The aperture gap 194, in the example shown, is positioned at a lower edge of the connector extension 186. The width of the aperture gaps 194 is smaller than the overall width of the apertures 190 and the width of the knitted loops 182. As such, the knitted loops 182 are fed into the apertures 190 and engaged to the connector extension 186 at the apertures 190. In other examples, the apertures 190 do not include the aperture gaps 194 and the knitted loops 182 are knitted through the apertures 190 during the knitting process.

Figure 17:
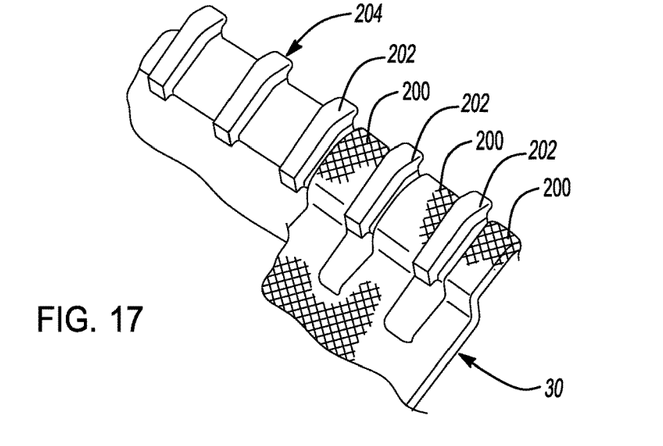
FIG. 17 is an illustration of an example zipper fastener member connected to a trim cover by a series of knitted loops.

In still another example trim cover 30, shown in FIG. 17, the trim cover 30 includes a series of knitted loops 200 that are knitted between teeth 202 of a zipper 204. The knitted loops 200 are integrally formed with the knitted trim cover 30. The zipper 204 is inserted into the knitting bed during the knitting process and the knitted loops 200 are knitted with one knitted loop 200 positioned between adjacent teeth 202 of the zipper 204. In such a manner, the zipper 204 is secured to the trim cover 30. As can be appreciated, the complementary second half of the zipper (not shown) is secured to a desired location on the vehicle seat 20 and the zipper 204 is secured to the complementary second half of the zipper to secure the trim cover 30 to the vehicle seat. Alternatively, the zipper 204 and the complementary second half of the zipper are joined to two sections of the trim cover 30 and the trim cover 30 is pulled over the seat 20 and secured thereto by connecting the zipper 204 to the complementary second half of the zipper.

Figure 18:
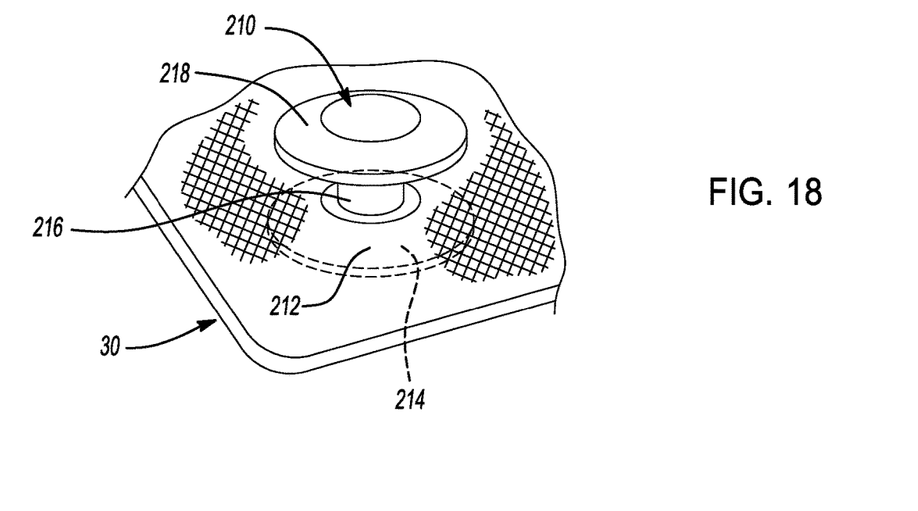
FIG. 18 is an illustration of an example rivet fastening member connected to a trim cover in a knitted pocket.

As shown in FIG. 18, the trim cover 30 includes, alternatively or in addition to the previously described fastener members, a brad 210 that is joined to the trim cover 30 in a knitted pocket 212. The brad 210, in the example shown, includes a base 214, a neck 216 and a cap 218. The base 214 is covered by the knitted pocket 212 to retain the brad 210 in the trim cover 30. The knitted pocket 212 is integrally knitted into the trim cover 30. The brad 210 is then inserted into the knitted pocket 212. The neck 216 projects away from the trim cover 30 and away from the knitted pocket 212. The cap 218 of the brad 210 is connected to the neck 216 on an end opposite to the base 214. As such, the cap 218 is spaced apart from the surface of the trim cover 30. The cap 218 is inserted through a button hole or is inserted into a slot on the vehicle seat 20 to retain the trim cover 30 in a desired position.

Figure 19:
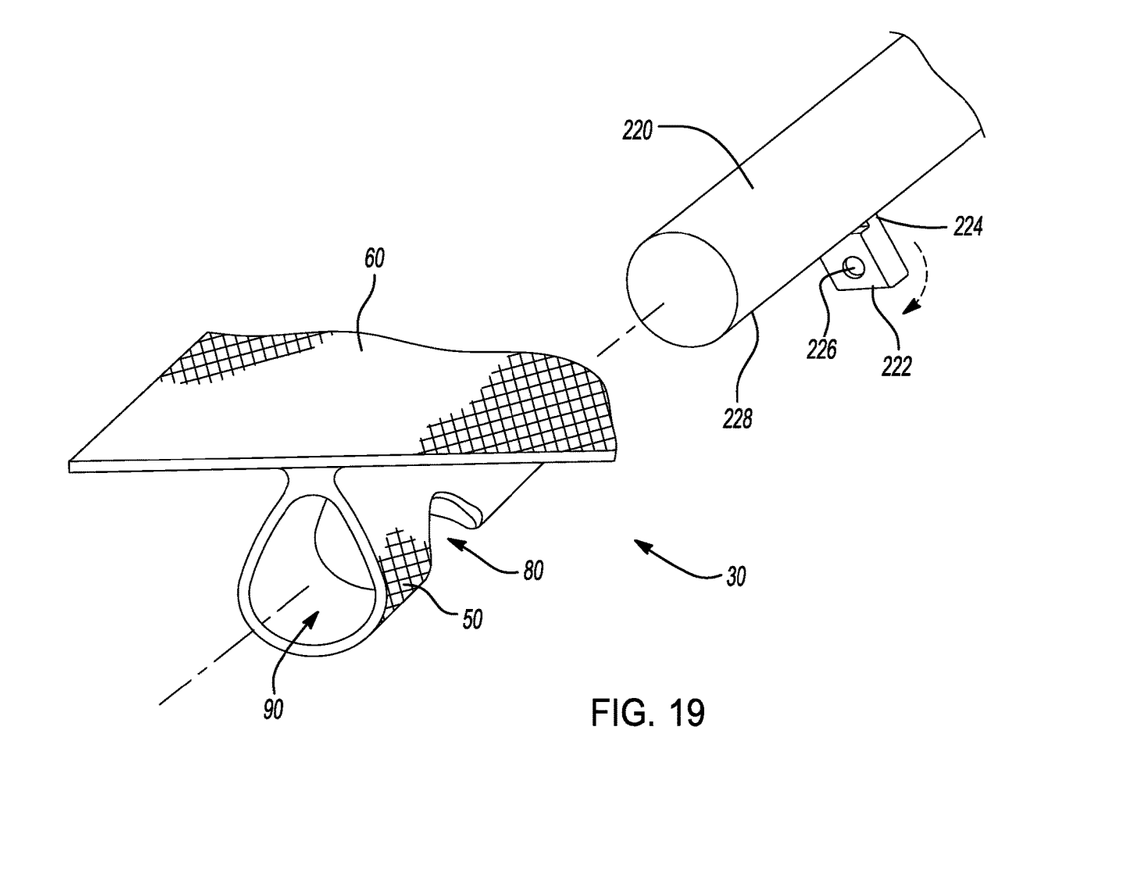
FIG. 19 is an exploded view of another example fastener member positioned inside a knitted fastener tube.

Referring now to FIG. 19, another example trim cover 30 includes the fastener tube 50. The fastener tube 50 projects downward from the trim panel 60. In the example shown, the fastener tube 50 includes the opening 80 that is positioned at a lower portion of the fastener tube 50. The fastener tube 50 is configured to accept a bar 220. The bar 220 is a cylindrical rigid member that includes one or more tabs 222 that project outward from an outer surface of the bar 220. The tab 222 are attached to the bar 220 at a hinge 224. The hinge 224, in the example shown, is molded into the bar 220 as a living hinge that permits the tab to rotate toward the outer surface of the bar 220. As shown, the bar 220 is shown with one tab 222 and the fastener tube 50 includes one opening 80. As can be appreciated, the bar 220 and the fastener tube 50 can include more than one tab 222 and more than one opening 80, respectively.

The bar 220, in this example, is inserted into the fastener tube 50. While the bar 220 is being inserted through the fastener tube 50, the tabs 222 rotate toward an outer surface 228 of the bar 220 to permit the bar 220 to easily slide through the central cavity 90 of the fastener tube 50. The bar 220 is inserted longitudinally until the bar 220 is positioned with the tab 222 located at the opening 80. In this position, the tab 222 rotates away from the bar 220 such that the tab 222 projects through the opening 80 in the fastener tube 50.

The tabs 222 limit the longitudinal movement of the bar 220 in the fastener tube 50. In addition, the tabs 222 include an attachment point 226. The attachment point 226, in this example, is a hole through the tab 222. When the tab 222 is positioned in the opening 80, a hook, length of wire, piece of hook and loop fastener, or other attachment is connected at the attachment point 226 from a support structure of the vehicle seat 20. In such a manner, the trim cover 30 is retained in a desired position on the vehicle seat 20.

In the example shown, the tab 222 is connected to the bar 220 with a living hinge 224 such that the tab 222 can move or flex in response to an external force being exerted on the tab 222. In another example, tabs 222 are biased toward a folded position in which the tabs 222 are rotated toward the outer surface 228 of the bar 220. In such an example, the bar 220 can also include an internal hole oriented axially through the bar 220. A deployment rod can be inserted into the internal hole of the bar 220 to deploy the tabs 222 to a deployed position in which the tabs are positioned perpendicularly to the axis of the bar 220.

As shown in FIG. 19, the bar 220 is a cylinder and the tab 222 has a rectangular shape. In other examples, the bar 220 can have a square, rectangular or other shaped cross-section. In addition, the tabs 222 can have a triangular, rounded or other shaped profile.

Figure 20:
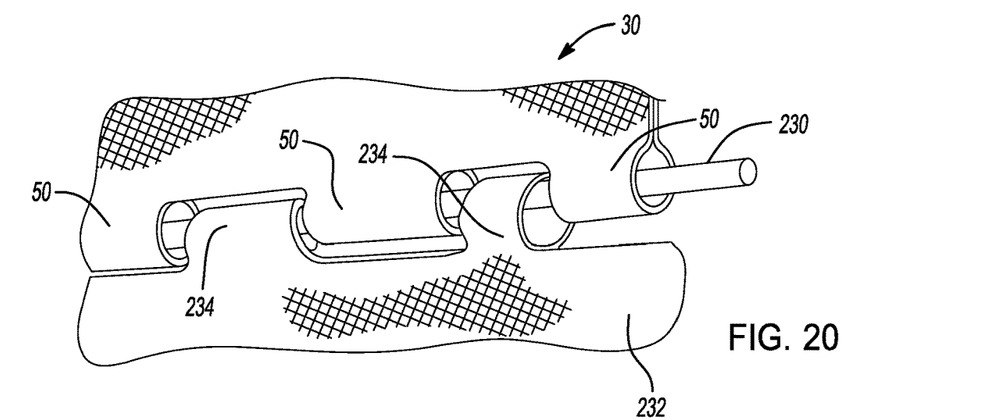
FIG. 20 is an illustration of two knitted fastener tubes connected to one another by an example link member.

Referring now to FIG. 20, the example trim cover 30 includes the fastener tube 50 that is connected to a complementary fastener tube 234 that is positioned on a support panel 232. The fastener tube 50 and the complementary fastener tube 234 are meshed together such that the fastener tube 50 and the complementary fastener tube 234 are co-axially aligned. A link member 230 is inserted through the meshed fastener tube 50 and the complementary fastener tube 234. The link member 230, in one example, is placed in the knitting machine during formation of the trim cover 30 and/or the support panel 232. As such, the fastener tube 50 and/or the complementary fastener tube 234 are knitted around the link member 230. In another example, the link member 230 is inserted through the fastener tube 50 and the complementary fastener tube 234 after the knitting process. In the alternative configurations, the trim cover 30 is retained relative to the support panel 232. As can be appreciated, the support panel 232 is connected between the foam support members 32 of the vehicle seat 20 (FIG. 1) or to other structural members of the vehicle seat 20.

The link member 230, in the example shown, is a cylindrical shaped length of rigid material. In other examples, the link member 230 can have other cross-sectional shapes and/or have projections, clips, or other features to secure the link member 230 to the trim cover 30.

Figure 21:
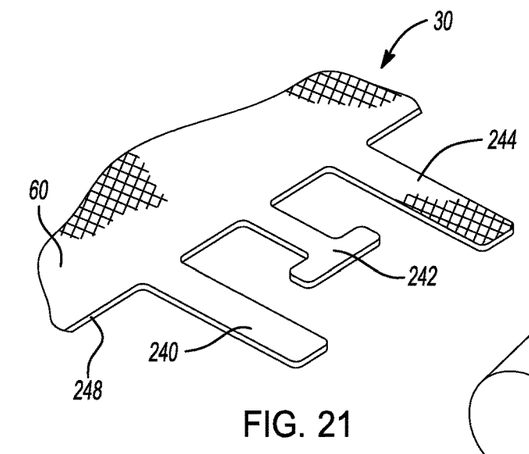
FIG. 21 is an illustration of a trim cover including example knitted flaps.
Figure 22:
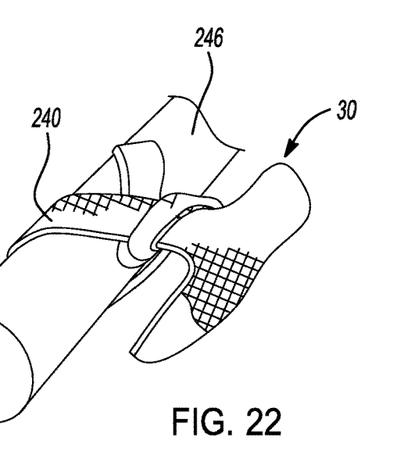
FIG. 22 is an illustration showing the knitted flaps of FIG. 21 tied to a support column.

As shown in FIGS. 21 and 22, the trim cover 30 can include one or more flaps of material that project outward from a side edge 248 of the trim panel 60 of the trim cover 30. In one example, the trim cover 30 includes a first flap 240, a second flap 242 and a third flap 244. The first flap 240, the second flap 242 and the third flap 244 are integrally knitted with the trim panel 60. The first flap 240 and the third flap 244 are rectangular in shape and have lengths that are greater than their widths. As such, the first flap 240 and the third flap 244 are elongated fastener members that permit the trim cover 30 to be tied to a support structure of the vehicle seat 20. As shown in FIG. 22, the first flap 240 is secured to a support column 246 by wrapping the first flap 240 around the support column 246 and tying the first flap 240.

The second flap 242, in this example, has a T-shape. As can be appreciated, the second flap 242 is secured to a support column by tying the second flap 242 as previously described with respect to the first flap 240. Alternatively, a complementary fastener loop (not shown) can be provided that loops over the T-shaped second flap 242. When tensioned, the second flap 242 secures the trim cover 30 in a desired position. In other examples of the trim cover 30, the first flap 240, the second flap 242 and/or the third flap 244 can have other shaped or profiles.

Figure 23:
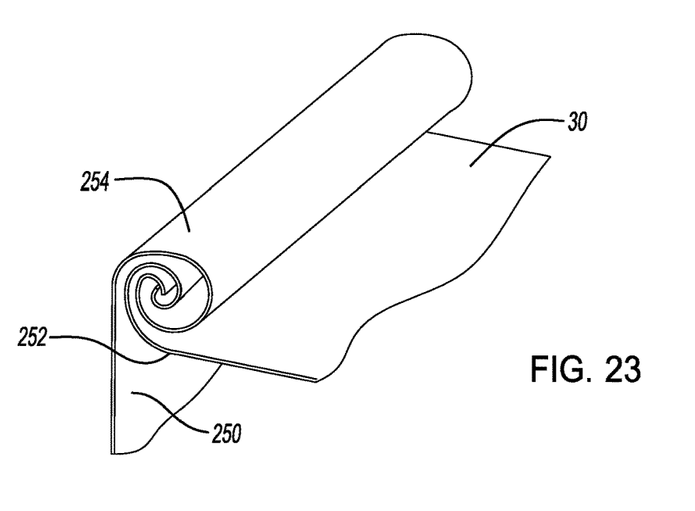
FIG. 23 is an illustration of a trim cover including an example rolled fastening member.

Referring now to FIG. 23, the trim cover 30, in this example, includes a rolled connector 252. The rolled connector 252 is a portion of the trim cover 30 that is rolled back on itself due to the stich construction in the region (i.e., the loops of the knit trim cover 30 are all oriented to either the front or the back side). As previously described, the trim cover 30 is made from a knitted material. When the fabric is knitted, the forces of the knitted yarns pull in a direction along the surface of the trim cover 30 and cause the edge of the trim cover to curl. This characteristic of the knitted fabric of the trim cover 30 causes the trim cover to have the rolled connector 252.

The rolled connector 252 is attached to a complementary rolled connector 254 that is positioned on a connector extension 250. The connector extension 250 is positioned on the vehicle seat 20 in a predetermined location. The connector extension 250 and the complementary rolled connector 254 are knitted materials and the complementary rolled connector 254 is created as previously described with respect to the rolled connector 252. The rolled connector 252 is connected to the complementary rolled connector 254 by straightening the rolled connector 252 and/or the complementary rolled connector 254 and positioning the straightened connectors adjacent to one another. The rolled connector 252 and the complementary rolled connector 254 are then rolled in an intertwined configuration such that the curled portions of the rolled connector 252 and the complementary rolled connector 254 are rolled in opposite rotational directions relative to one another. In this configuration, the trim cover 30 is retained relative to the connector extension 250. In some examples, the knitted fabrics of the rolled connector 252 and/or the complementary rolled connector 254 can include wire, heat-activated, textured or relatively more rigid yarns than surrounding yarns to cause the rolled connector 252 and/or the complementary rolled connector 254 to maintain its rolled shape.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A knitted seat trim cover for attachment to a vehicle seat, the knitted seat trim cover comprising:
    a knitted trim panel configured to be installed over one or more support members of the vehicle seat;
    at least one fastener tube integrally knitted to the trim panel and positioned on a back side of the trim panel facing the one or more support members; and an elongated fastener member positioned inside the at least one fastener tube, the elongated fastener member being configured to releasably connect to a complementary fastener member on the vehicle seat, wherein the elongated fastener member has an open cross-sectional shape configured to receive the complementary fastener member, and at least a portion of the at least one fastener tube is positioned inside the open cross-sectional shape of the elongated fastener member between the elongated fastener member and the complementary fastener member when the complementary fastener member is connected to the elongated fastener member.

2. The knitted seat trim cover of claim 1, wherein the at least one fastener tube is positioned laterally across the trim panel and extends from an inboard side of the trim panel to an outboard side of the trim panel.

3. The knitted seat trim cover of claim 1, wherein the at least one fastener tube includes a first fastener tube and a second fastener tube, the first fastener tube is integrally knitted to the trim panel and is positioned laterally across the trim panel from an inboard side of the trim panel to an outboard side of the trim panel, and the second fastener tube is integrally knitted to the trim panel and is positioned perpendicularly to the first fastener tube.

4. The knitted seat trim cover of claim 1 wherein a portion of the at least one fastener tube is positioned between the elongated fastener member and the complementary fastener member when the elongated fastener member is connected to the complementary fastener member.

5. A knitted seat trim cover for attachment to a vehicle seat, the knitted seat trim cover comprising:
a knitted trim panel configured to be installed over one or more support members of the vehicle seat;
at least one fastener tube integrally knitted to the trim panel and positioned on a back side of the trim panel facing the one or more support members; and
an elongated fastener member positioned inside the at least one fastener tube, the elongated fastener member being configured to releasably connect to a complementary fastener member on the vehicle seat, wherein:
the at least one fastener tube includes one or more openings; and
the elongated fastener member includes one or more projections that project through the one or more openings in the at least one fastener tube, the one or more projections configured to connect to the complementary fastener member.

6. A knitted seat trim cover for attachment to a vehicle seat, the knitted seat trim cover comprising:
a knitted trim panel configured to be installed over one or more support members of the vehicle seat;
at least one fastener tube integrally knitted to the trim panel and positioned on a back side of the trim panel facing the one or more support members; and
an elongated fastener member positioned inside the at least one fastener tube, the elongated fastener member being configured to releasably connect to a complementary fastener member on the vehicle seat, wherein:
the elongated fastener member includes a male portion with a rounded cross-sectional profile; and
the complementary fastener member has an elongated groove sized to accept the male portion of the elongated fastener member and the at least one fastener tube therein.

7. The knitted seat trim cover of claim 1 wherein the at least one fastener tube is configured to stretch when contacted by the complementary fastener member to permit the complementary fastener member to engage the elongated fastener member positioned inside the at least one fastener tube.

8. A knitted seat trim cover for attachment to a vehicle seat, the knitted seat trim cover comprising:
a knitted cover panel configured to be installed over one or more foam support members of the vehicle seat, the knitted cover panel including at least one knitted loop integrally knitted in the knitted cover panel; and
a fastener member connected to the knitted cover panel by the at least one knitted loop,
wherein the fastener member is configured to releasably connect to a complementary fastener member on the vehicle seat to secure the knitted cover panel relative to the one or more foam support members of the vehicle seat.

9. The knitted seat trim cover of claim 8 wherein the at least one knitted loop is knitted through an opening in the fastener member.

10. The knitted seat trim cover of claim 8 wherein the at least one knitted loop is knitted around one or more projections on the fastener member.

11. The knitted seat trim cover of claim 8 wherein:
the fastener member is a first half of a zipper that includes a plurality of teeth;
the at least one knitted loop includes a plurality of knitted loops, the plurality of knitted loops positioned between the plurality of teeth;
the complementary fastener member on the vehicle seat is a second half of the zipper; and
the first half of the zipper configured to releaseably connect to the second half of the zipper to secure the knitted cover panel to the vehicle seat.

12. The knitted seat trim cover of claim 8 wherein:
the fastener member is an elongated rigid bar with a continuous cross-section;
the fastener member includes a connecting portion configured to fit inside a corresponding receiving portion of the complementary fastener member; and
the fastener member includes at least one aperture, the at least one knitted loop positioned in the at least one aperture to attach the knitted cover panel to the fastener member.

13. The knitted seat trim cover of claim 8 wherein:
the fastener member is a toggle button including a central hole extending therethrough; and
the at least one knitted loop extends through the central hole of the toggle button.

14. The knitted seat trim cover of claim 8 wherein:
the at least one knitted loop includes a plurality of knitted loops aligned in a transverse direction across the knitted cover panel; and
the fastener member is connected transversely to the knitted cover panel by the plurality of knitted loops.

15. The knitted seat trim cover of claim 14, further comprising a second fastener member wherein:
the knitted cover panel includes a second plurality of knitted loops aligned in a direction perpendicular to the plurality of knitted loops; and
the second fastener member is connected to the knitted cover panel by the second plurality of knitted loops.

16. The knitted seat trim cover of claim 8, wherein the at least one knitted loop is an elongated knitted tube and the fastener member is positioned inside the elongated knitted tube.

* * * * *